United States Patent [19]
Baumgartner et al.

[11] Patent Number: 5,417,468
[45] Date of Patent: May 23, 1995

[54] RECREATIONAL VEHICLE FOLDABLE DECK

[76] Inventors: Gerald J. Baumgartner, 12947 Nancy Lee Dr., St. Louis, Mo. 63146-4375; Jeff Klingerman, 1905 Northfild, St. Louis, Mo. 63114; Ron Young, 10215 Reba Dr., St. Louis, Mo. 63136

[21] Appl. No.: 117,605

[22] Filed: Sep. 7, 1993

[51] Int. Cl.⁶ .............................................. B60P 3/37
[52] U.S. Cl. .................................. 296/162; 296/172; 52/69
[58] Field of Search ................. 296/26, 161, 162, 169, 296/172, 174, 176, 180.1, 180.4; 52/69

[56] References Cited

U.S. PATENT DOCUMENTS

| | | | |
|---|---|---|---|
| 1,318,994 | 10/1919 | Hancock . | |
| 1,320,794 | 11/1919 | Palmer et al. . | |
| 1,771,911 | 7/1930 | Berneking . | |
| 2,155,876 | 4/1939 | Stout | 20/2 |
| 2,167,557 | 7/1939 | Stout | 296/23 |
| 2,368,936 | 2/1945 | McGehee | 296/172 |
| 2,395,691 | 2/1946 | Smith | 20/2 |
| 2,636,773 | 4/1953 | Van Tassel | 296/172 |
| 3,070,850 | 1/1963 | McClure, Sr. | 52/69 |
| 3,226,890 | 1/1966 | Flajole | 52/66 |
| 3,511,529 | 5/1970 | Cutsinger | 296/23 |
| 3,531,152 | 9/1970 | Tyler | 296/23 |
| 3,620,564 | 11/1971 | Wenger et al. | 52/69 X |
| 3,633,324 | 1/1972 | Cuylits | 52/66 |
| 4,155,204 | 5/1979 | Prozinski | 52/69 |
| 4,707,015 | 11/1987 | Klomfass | 296/180.4 |
| 4,883,306 | 11/1989 | Stucky | 296/162 |
| 4,912,892 | 4/1990 | Jurgensen | 52/69 |
| 5,226,689 | 7/1993 | Roe et al. | 296/159 |

FOREIGN PATENT DOCUMENTS

| | | | |
|---|---|---|---|
| 1371954 | 8/1964 | France | 296/162 |
| 2535658 | 5/1984 | France | 296/176 |

*Primary Examiner*—Dean J. Kramer
*Attorney, Agent, or Firm*—Senniger, Powers, Leavitt & Roedel

[57] ABSTRACT

The deck system includes a generally rectangular platform hingedly securable along an edge to a bottom edge of a recreational vehicle for pivotal movement between an extended position in which it lies substantially horizontally along a side of the recreational vehicle and a retracted position in which it lies in a substantially vertical position adjacent the side of the recreational vehicle; a plurality of platform support members pivotally attached to a bottom of the platform adjacent an edge remote from the platform edge hingedly securable to the recreational vehicle and engageable with the ground to support the platform in its extended position; a pair of lifting motors pivotally connected to opposite side edges of the platform and pivotally connectable to the recreational vehicle for moving the platform between its retracted and extended positions; and a remote control device for remotely controlling the lifting motors. The deck also preferably includes a door hingedly mounted in the platform for alignment with a door in the recreational vehicle to which it is attached so as to permit access into the interior of the vehicle when the platform is in its retracted or raised position. The deck system also further includes the underside of the platform being textured and decorated to match the texture and decoration on the side of recreational vehicle to which it is attached. An air deflector is also preferably included on the forward edge of the side of the vehicle to which the platform is attached so as to prevent direct impingement of air on the end portion of the platform adjacent thereto as the vehicle is moving.

1 Claim, 3 Drawing Sheets

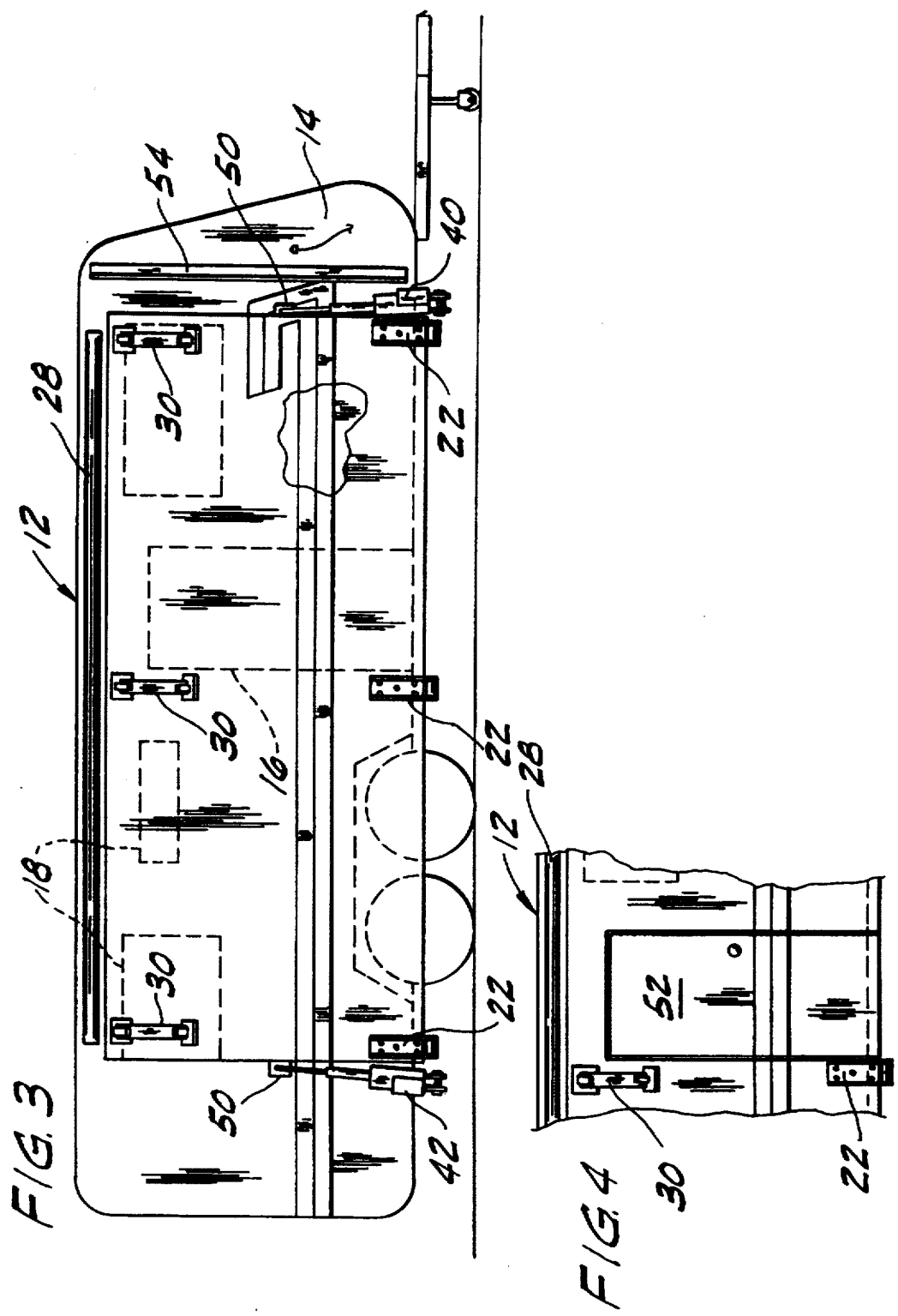

RECREATIONAL VEHICLE FOLDABLE DECK

BACKGROUND OF THE INVENTION

1. Field of the Invention

The present invention relates to accessories for recreational vehicles, mobile homes and the like and, more particularly, to foldable decks for attachment thereto.

2. Prior Art

When using recreational vehicles with sleeping and living areas for camping it has been common for the occupants to carry some form of flooring to be laid on the ground next to the vehicle in order to provide an expanded living area without the dirt and unevenness and other inconveniences of using the ground directly. However, such known types of additional flooring are bulky and must be disassembled for storing inside the recreational vehicle.

Other known types of additional flooring include decks which are hinged to the side of the vehicle and must be raised and lowered manually, requiring the assistance of several people. Yet others utilize an elaborate rope and pulley system to raise and lower the deck into position. Such devices are cumbersome to operate and the ropes interfere with ease of utilization of the deck since they extend from an upper portion of the vehicle to an outer edge of the deck along the side edges of the deck.

Still further alternatives include complete rooms that unfold from the side of a vehicle through elaborate rope and pulley mechanisms which are relatively expensive and thus not suited for use in moderately priced camping vehicles. Yet other prior art devices include flooring which stores under the vehicle and is slid laterally out into position. This latter type of deck is not easily added to existing vehicles since it would be positioned too low to the ground for travel when stored under the vehicle and does not allow for a deck to extend the length of the vehicle because of the positions of tires on the vehicle.

Those prior art decks which are folded against the side of the recreational vehicle cover the access door when in the folded position, thus preventing access to the inside of the vehicle during transit. In addition, since it is the under side of the deck that is seen, they are not compatible with the appearance and ornamentation on the side of the vehicle, thus providing an aesthetically unpleasing appearance during travel.

SUMMARY OF THE INVENTION

The present invention overcomes the above-described difficulties and disadvantages associated with prior art recreational vehicle decks by providing a deck system which can be automatically raised and lowered with motorized lifts which do not interfere with access to the deck, a deck system with an integral door which is aligned with the door of the recreational vehicle so as to allow entry during travel, and a deck system which has an exterior appearance when in the raised position so that it has the texture and/or ornamentation of the original siding of the vehicle.

The deck system of the present invention includes a generally rectangular platform hingedly securable along an edge to a bottom edge of a recreational vehicle for pivotal movement between an extended position in which it lies substantially horizontally along a side of the recreational vehicle and a retracted position in which it lies in a substantially vertical position adjacent the side of the recreational vehicle; a plurality of platform support members pivotally attached to a bottom of the platform adjacent an edge remote from the platform edge hingedly securable to the recreational vehicle and engageable with the ground to support the platform in its extended position; at least one lifting means pivotally connected to a side edge of the platform and pivotally connectable to the recreational vehicle for moving the platform between its retracted and extended positions; and means for remotely controlling the at least one lifting means for movement between its extended and retracted positions.

The deck system of the present invention also preferably includes the lifting means having a pair of reversible lifting motors operatively connected to respective screw drives which move the platform between its extended and retracted positions. The deck also preferably includes a door hingedly mounted in the platform for alignment with a door in the recreational vehicle to which it is attached so as to permit access into the interior of the vehicle when the platform is in its retracted or raised position. The deck system of the present invention also further includes the underside of the platform being textured and decorated to match the texture and decoration on the side of recreational vehicle to which it is attached. An air deflector means is also preferably included on the forward edge of the side of the vehicle to which the platform is attached so as to prevent direct impingement of air on the end portion of the platform adjacent thereto as the vehicle is moving.

BRIEF DESCRIPTION OF THE DRAWINGS

FIG. 3 is a side view of the preferred embodiment; and

FIG. 4 is a partial view of an alternative embodiment including a door in the platform in registry with the door in the recreational vehicle.

DETAILED DESCRIPTION OF THE PREFERRED EMBODIMENTS

Figure 1:
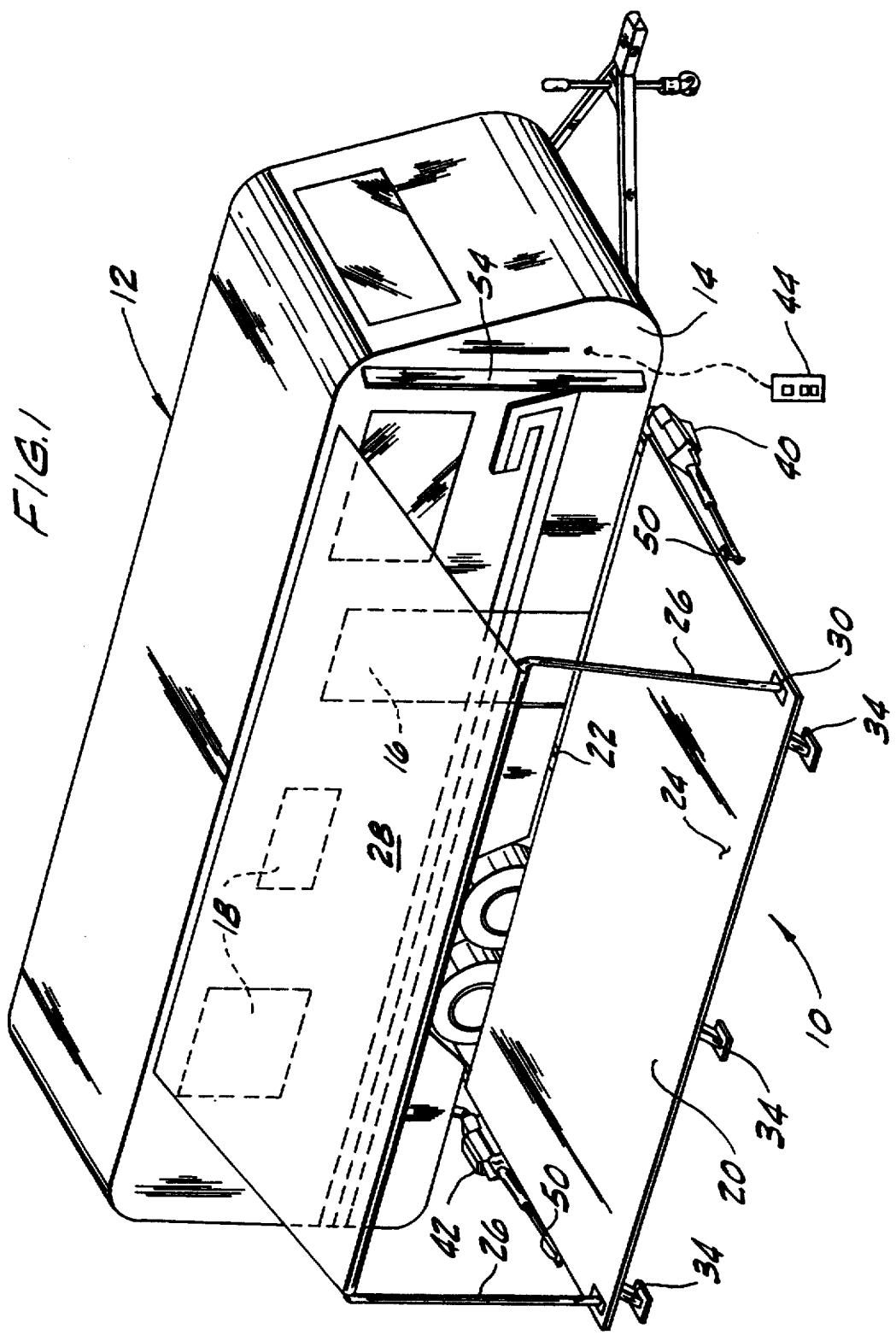
FIG. 1 is a perspective view of the preferred embodiment of the present invention attached to a recreational vehicle.

The deck system 10 of the present invention is shown attached to a recreational vehicle 12. The vehicle 12 can be of any conventional construction, such as mobile homes, trailers or motor driven vehicles, and forms no part of the present invention. For the purpose of illustration of an application of the deck system 10 of the present invention only, such vehicles 12, however, generally provide a substantially flat side 14 which usually includes a door 16 for entering the interior of the vehicle 12, and often contains windows 18 as well. However, it is to be understood that the type of recreational vehicle to which the present invention is attached is not to be a limitation on the present invention since it is contemplated that it would be useful for all types of motorized or non-motorized vehicles or trailers.

The deck system 10 includes a platform 20 which can be of many different constructions. Although it is shown as a single piece, it is contemplated that the platform 20 can be constructed of multiple pieces with an appropriate frame structure or other means of assembly to form the size of platform 20 desired for a particular application. This size can vary depending on the desired length and width of the platform 20, the only limitation on the size being that it remain generally within the limits of the area of the side 14 of the vehicle 12 to which it is intended to be attached.

The platform 20 is hingedly attached to the bottom of the vehicle along the lower side edge thereof, such as by a plurality of hinges 22. These hinges 22 permit the platform 20 to be pivoted between an extended position, wherein it is essentially horizontal, as shown in FIG. 1, and a retracted position, wherein it is essentially vertical and lying adjacent the side of the vehicle 14, as shown in FIG. 3. Hinges 22 preferably are of the type in which the hinge pins can be easily removed so that the platform 20 can be easily detached from the Recreational Vehicle 12. Provision can be made in the upper surface 24 of the platform 20 for attachment of support poles 26 for a conventional awning 28, such as by providing attachment plates 30 which include pins that extend into the hollow end of poles 26 to hold them in place.

Figure 2:
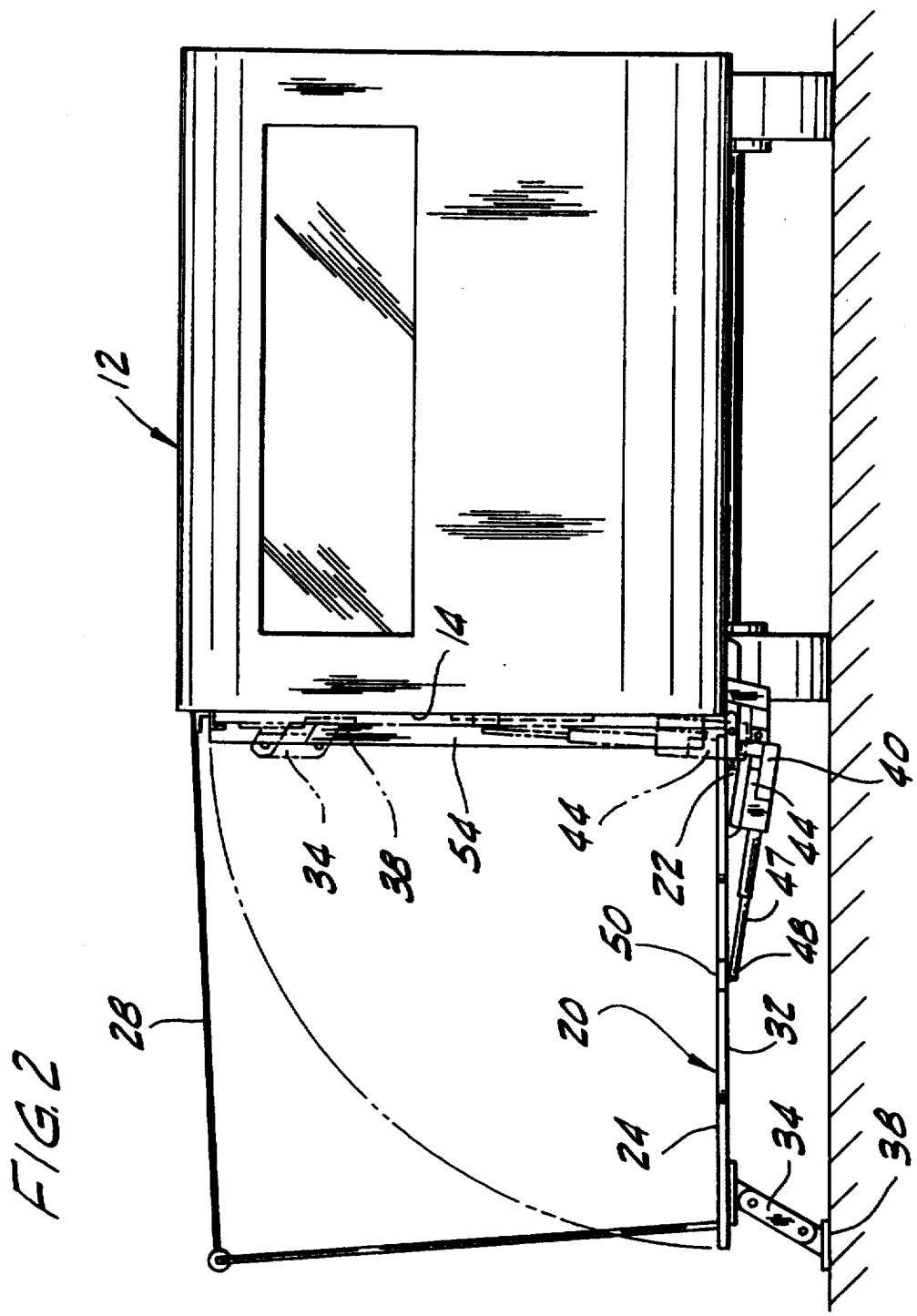
FIG. 2 is a front end view of the preferred embodiment.

Attached to the underside 32 of platform 20 are a plurality of support members 34. Each support member 34 is pivotally mounted to a bracket 36 so that it can be pivoted between a storage position adjacent the bottom surface 32 of the platform 20 when the platform is in its retracted position lying against the side 14 of the recreational vehicle 12, as shown in FIG. 3, and a support position where the support member 34 is extended for platform supporting engagement with the ground, as shown in FIG. 2. A support base 38 is pivotally mounted to the lower end of each support member 34 to provide an enlarged surface area for engagement with the ground. Each support member 34 can also be provided with means (not shown) for lengthening or shortening each one to compensate for unevenness in terrain. Base 38 can be pivoted into a storage position for travel, as shown in FIG. 3.

Lifting means in the form of a pair of reversible screw drive motors 40 and 42 are provided to pivot the platform 20 between its extended position in which it lies substantially horizontal along a side of the Recreational Vehicle, and a retracted position in which it lies in a substantially vertical position adjacent the side of the recreational vehicle. Each drive motor 40 and 42 is preferably of the type referred to as a Swing Gate opener (part no. SGO-1) sold by Genie, Inc. Motors 40 and 42 are preferably remote controlled by a transmitting unit 44, or by a switching unit wired into to the recreational vehicle (shown by the dotted line in FIG. 1). The drive motors 40 and 42 are preferably slaved together to operate simultaneously.

Each motor 40 and 42 is mounted by its main housing for pivotal movement to a respective bracket 46 secured to the underside of the recreational vehicle. The opposite end or screw portion 47 of each motor 40 and 42 is pivotally mounted as at 48 to a respective bracket 50 attached to the underside 32 of platform 20 adjacent each side edge thereof. Alternative attachment means (not shown) may also be used, such as a slide connection along each side of the platform so that as the motors 40 and 42 are operated a slide member can slide along a bar or other support to allow greater movement of the screw member portion 47 of the drive motors 40 and 42, thus requiring less of distance beneath the floor of the recreational vehicle for mounting the end of the drive motors in order to reduce the force required to raise and lower the platform 20.

The underside 32 of platform 20 is preferably textured and painted to have the same appearance as the side 14 of recreational vehicle 10 so that when the platform 20 is in the raised position for transporting it has the appearance of the side of the vehicle and is thus less noticeable and more aesthetically pleasing. A pair of latches (not shown) are preferably mounted to the top edge of the Recreational Vehicle 12 and the edge of platform 20 to hold the platform in its raised position during travel.

It is also contemplated as an alternative embodiment that a door 52 can be mounted in the platform 20, as shown in FIG. 4. The door 52 is mounted in alignment with the door 16 in the recreational vehicle 12 so that when the platform 20 is in its raised position for traveling, a person can enter the vehicle by opening door 52 and then door 16. The side of door 52 that forms part of the top surface of platform 20 is flush with the rest of the platform and the door is mounted so as to be secure for supporting persons who may walk on the platform.

Mounted at the front along the side 14 of the recreational vehicle 12 is a wind deflector 54. Deflector 54 extends for a height approximately equal to the width of the platform 20 and has a thickness sufficient to deflect the air over the underside of the platform so that when the platform is in the retracted position against the side 14 of the recreational vehicle the wind deflector 54 deflects most of the wind away from the platform to prevent it from forcing the platform away from the side 14 of the vehicle.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A retractable deck for attachment to a recreational vehicle, comprising:

a generally rectangular platform hingeably securable along an edge thereof to a bottom edge of a recreational vehicle for pivotal movement between an extended position in which it lies substantially horizontally along a side of the recreational vehicle and a retracted position in which it lies in a substantially vertical position adjacent the side of the recreational vehicle;

a plurality of platform support members pivotably attached to a bottom of the platform adjacent an edge thereof remote from the platform edge hingedly securable to the recreational vehicle, and engageable with the ground to support the platform in its extended position;

at least one lifting means pivotably connected to a side edge of the platform and pivotably connectable to the recreational vehicle for moving the platform between its extended and retracted positions;

means for remotely controlling the at least one lifting means for movement of the platform between its extended and retracted positions; and a door hingedly mounted in the platform for alignment with a door in a recreational vehicle to which it is attached so as to permit access into the interior of the recreational vehicle when the platform is in its retracted position.

* * * * *